United States Patent
Zeilbeck et al.

(10) Patent No.: US 12,222,888 B2
(45) Date of Patent: Feb. 11, 2025

(54) CONTROL SYSTEM FOR A BUS SYSTEM HAVING AT LEAST TWO TRANSMISSION LINES

(71) Applicant: Webasto SE, Stockdorf (DE)

(72) Inventors: Michael Zeilbeck, Stockdorf (DE); Sergej Hermann, Stockdorf (DE); Patrick Assmann, Stockdorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 18/008,778

(22) PCT Filed: Jun. 8, 2021

(86) PCT No.: PCT/EP2021/065280
§ 371 (c)(1),
(2) Date: Dec. 7, 2022

(87) PCT Pub. No.: WO2021/249997
PCT Pub. Date: Dec. 16, 2021

(65) Prior Publication Data
US 2023/0176992 A1 Jun. 8, 2023

(30) Foreign Application Priority Data

Jun. 8, 2020 (DE) .......................... 102020115210.8

(51) Int. Cl.
*G06F 13/40* (2006.01)
(52) U.S. Cl.
CPC ...... *G06F 13/4086* (2013.01); *G06F 13/4081* (2013.01)

(58) Field of Classification Search
CPC ............. G06F 13/4086; G06F 13/4081; G06F 13/4068; G06F 13/4063; G06F 13/40; H04L 12/40032
See application file for complete search history.

(56) References Cited

U.S. PATENT DOCUMENTS

| | | |
|---|---|---|
| 2008/0027598 A1 | 1/2008 | Okuyama et al. |
| 2010/0060314 A1 | 3/2010 | Boericke, II et al. |
| | (Continued) | |

FOREIGN PATENT DOCUMENTS

| | | |
|---|---|---|
| DE | 19933824 A1 | 2/2001 |
| DE | 102006018871 A1 | 10/2007 |
| | (Continued) | |

OTHER PUBLICATIONS

International Search Report for PCT/EP2021/065280 mailed Sep. 9, 2021.

*Primary Examiner* — Jung Kim
(74) *Attorney, Agent, or Firm* — Command IP LLP; Michael Zarrabian

(57) ABSTRACT

A control system for use in a bus system having at least two transmission lines, having a first control device which has a first termination path and a first terminating resistor connected to the first termination path, a second control device which has a second termination path and a second terminating resistor connected to the second termination path, a first connector which is adapted to connect the first control device to the transmission lines and therefore to integrate the first control device in the bus system, a second connector which is adapted to connect the second control device to the transmission lines and therefore to integrate the second control device in the bus system, wherein the first connector and the second connector are different to one another.

11 Claims, 2 Drawing Sheets

(56) References Cited

U.S. PATENT DOCUMENTS

2012/0231663 A1    9/2012  Dozier et al.
2014/0207994 A1*   7/2014  Cherkaoui .............. H04L 12/42
                                                         710/312
2016/0179737 A1    6/2016  Brouwer et al.

FOREIGN PATENT DOCUMENTS

DE     202013001373 U1    12/2013
DE     102016224963 A1     6/2018

* cited by examiner

CONTROL SYSTEM FOR A BUS SYSTEM HAVING AT LEAST TWO TRANSMISSION LINES

CROSS-REFERENCE TO RELATED APPLICATIONS

This application is a 35 U.S.C. § 371 National Stage Entry of International Application No. PCT/EP2021/065280 filed Jun. 8, 2021, which claims the priority benefit of German Patent Application Serial Number DE 10 2020 115 210.8 filed Jun. 8, 2020, all of which are incorporated herein by reference in their entirety for all purposes.

TECHNICAL FIELD

The present invention relates to a control system for a bus system having at least two transmission lines. The invention further relates to a connector for connecting a control unit to a bus system. The invention also relates to a method for configuring a bus system.

BACKGROUND

Bus systems generally serve to transmit data in the form of signals between a number of components via common transmission lines. CAN (Controller Area Network) bus systems in particular represent a serially connected bus system which interconnects a plurality of control units via two transmission lines. A terminating resistor is disposed in each case at the end of the actually open transmission lines to avoid reflections of the signals on the line ends and guarantee a required total impedance in the bus system.

EP 3 040 871 B1 aims to provide a CAN bus system which has two terminating resistors which are arranged between a CAN high line and a CAN low line. A connector is arranged in each case between an electronic component of the CAN bus system and the transmission lines. The connector is switchable between two different operating stages. In a first operating stage, pins arranged in the connector are switched in such a way that the current flow in the transmission lines must in each case pass through a resistor whereas, in a second operating stage, it does not have to pass through a resistor due to a corresponding pin arrangement. An electronic component thus electively implements, for example, a terminating resistor via the switchable operating stage assumed by the connector.

EP 3 113 430 A1 discloses an electronic component for use in a CAN bus system. The electronic component can electively implement a terminating resistor insofar as it is instructed to do so by a switch part. In such a case, a transistor circuit provided in the switch part switches a number of transistors in such a way that a current flow in the transmission lines must pass through a terminating resistor.

DE 10 2012 223 530 A1 discloses a dynamic line termination of communication buses, such as a CAN bus system, in monitoring circuits for battery modules. A line-terminating resistor is activatable via the closure of a switch which is connected to an electronic control system, whereby a current flow in the transmission lines must pass through a terminating resistor.

The disadvantage of the known switchable systems is that the resistors are activatable and deactivatable in the individual systems and the entire bus is accordingly non-functional in the event of incorrect operation. In addition, increased complexity in the control and an increase in required individual components are necessary in order to achieve a corresponding switchability.

SUMMARY OF THE INVENTION

Based on the known prior art, one object of the present invention is to provide an improved control system for use in a bus system having at least two transmission lines, and an improved connector for connecting a control unit to transmission lines of a bus system. The invention also aims to provide an improved method for configuring a bus system having at least two transmission lines.

The object is achieved by a control system with the features of claim 1, a connector with the features of claim 8, and also by means of a method with the features of claim 10. Advantageous developments are set out in the dependent claims, the description and the figures.

A control system for a bus system having at least two transmission lines is proposed accordingly.

A bus system is understood here in the first instance to mean a system for transmitting data between a plurality of components via a common transmission path.

The bus system has a plurality of control units which are interconnected via two transmission lines, wherein all control units are simultaneously connected to both transmission lines. The actually open transmission lines must be terminated on their ends and/or on branches with a terminating resistor in order to prevent reflections and the resulting interference on the transmission lines.

Transmission lines are understood to mean the lines used in the bus system for signal transmission. At least two transmission lines are arranged in order to be able to transmit a signal between these transmission lines via a voltage difference. One transmission line can be referred to here as a high line, another as a low line. An interface can be arranged in each case between the two transmission lines, i.e. at least two interfaces in total. A terminating resistor can be arranged in each case on the at least two interfaces in order to terminate the transmission lines on one hand and, on the other hand, to enable the bus system to maintain a total impedance. The total impedance can, for example, be 60 ohms.

With the use of two transmission lines, a serial transmission of the data can take place in which the data are divided into smallest units (bits) which are then transmitted in succession via the transmission lines. In other topologies, a plurality of transmission lines can also be provided, for example eight parallel transmission lines, so that information packets (bytes) can be transmitted simultaneously. Irrespective of the number of transmission lines used, these lines must be terminated with terminating resistors on their actually open ends.

The terminating resistors can be arranged in each case in a control unit designable, for example, as a main control unit and a control unit furthest away from this main control unit. The two terminating resistors can be designed, for example, as two parallel-connected 120-ohm resistors in order to achieve a total impedance of, for example, 60 ohms.

The bus system can be designed, for example, as a CAN bus system which can be designed as a linear CAN topography.

The control system has a first control unit which has a first termination path and a first terminating resistor connected to the first termination path. A first control unit can be understood to mean an electronic component communicating via the bus system, for example the CAN bus system. For use in a motor vehicle, control units of this type can be e.g. an engine control unit (ECU) for an electric motor or an internal combustion engine, a battery controller, or control units which are responsible for a vehicle circuit, an airbag or other electronically controllable components. A first control unit associated with the control system can consequently assume different physical designs depending on the respective task to be performed. A first termination path can be understood to mean an electrical line located in the first control unit which is coupled on its one end to the first terminating resistor and which has an interface couplable to a connector on its other end. If the first termination path is connected to a transmission line of the bus system, the first terminating resistor can be integrated into the bus system as a termination.

The first terminating resistor can be a resistor which is configured to reduce residual voltages present in the bus system in order to avoid reflections in the transmission lines of the bus system. It can implement, for example, a resistance of 120 ohms. Along with the first termination path and the first terminating resistor, the first control unit can also have further electronic components in order to be able to perform the function provided for the first control unit. However, the specific implementation of these further electronic components has no essential significance for the present subject-matter of the invention. The termination or termination function refers here to the functionality whereby reflections occurring in the bus system which can cause interference and therefore signal faults are avoided by means of a targeted power dissipation on the respective terminating resistor. The terminating resistor correspondingly forms an attenuator.

The control system has a second control unit which has a second termination path and a second terminating resistor connected to the second termination path. A second control unit can be understood to mean an electronic component communicating via the bus system. The description given in connection with the first control unit can be referred to for corresponding examples.

A second control unit associated with the control system can consequently assume different physical designs. A second termination path can be understood to mean an electrical line located in the second control unit which is coupled on its one end to the first terminating resistor and which has an interface couplable to a connector on its other end. If the second termination path is connected to a transmission line of the bus system, the second terminating resistor can be integrated as a termination of the bus system.

The second terminating resistor can be a resistor which is configured to reduce residual voltages present in the system. The description given in connection with the first terminating resistor can be referred to for further possible designs.

Along with the second termination path and the second terminating resistor, the second control unit can also have further electronic components in order to be able to perform the flexibly adaptable function provided for the second control unit. However, the specific implementation of these further electronic components has no essential significance for the present subject-matter of the invention. The first and the second control unit can be designed as structurally identical to one another and, in particular, can provide identical hardware functionality. The first and the second control unit can at least be designed as identical in respect of the termination path and the terminating resistor.

For the sake of completeness, it should be noted that the control system is not intended to be restricted to a number of two control units. A multiplicity, for example up to 70, control units can obviously be incorporated in practice into the bus system, for example a CAN bus system. The concept underlying the present invention is, however, already applicable to a control system having two control units, and for this reason only the two control units will be discussed in the further disclosure, without the control system being intended to be restricted thereto.

The respective control unit can also comprise more than one termination path, so that, even with a bus topology having more than two "ends", the control unit can correctly terminate its respective end and the terminal resistance can be adapted accordingly. The control unit can be used, for example, in a bus topology in which only two control units terminate, i.e. the transmission lines have only two open ends which are therefore to be terminated. The control unit provides, for example, a termination path with a terminal resistance of 120 ohms for this purpose, so that the two terminating control units connected in parallel with one another jointly provide a total impedance of 60 ohms for the termination.

In order to terminate a practically "star-shaped" bus topology in which, for example, four control units must terminate and the transmission lines therefore have four open ends which are therefore to be terminated, a terminal resistance of 240 ohms, for example, can then be provided in a further termination path so that, with the joint termination of the bus by the four parallel-arranged control units, a total impedance of 60 ohms is again provided.

A control unit which provides more than one termination path can accordingly be used flexibly in different bus topologies. This is provided, in particular, for different CAN bus topologies also.

The control system has a first connector which is adapted to connect the first control unit to the transmission lines of the bus system and therefore to integrate the first control unit into the bus system. In the present disclosure, a component which is adapted or prepared or configured to implement a function has all structural and functional characteristics for achieving that function in operation. The first connector can therefore implement the interface between the transmission lines of the bus system and the first control unit. Along with the transmission lines, further lines, such as, for example, power supply lines, can also be connected via the connector to the control unit.

The first connector can have different chambers into which pins can be inserted during a pin assignment. Pins can be understood to mean plug-in connectors. They can serve to connect and disconnect electrical lines. The pins can be fixed in a form-locking and/or force-locking manner. They can be arranged in the respective chambers in a detachable or non-detachable manner. The pin assignment can be designated as the process in which electrical lines in the control unit are connected to the bus system through targeted insertion of the pins. The pin assignment can electively be performed only if the actual position of the control unit in the bus system is known. Alternatively, the pin assignment can also be performed even if only the function, but not yet the position, of the control unit in the bus system is known.

The control system has a second connector which is adapted to connect the second control unit to the transmission lines of the bus system and therefore to integrate the second control unit into the bus system. The second connector can therefore implement the interface between the transmission lines of the bus system and the second control unit. The second connector can have different chambers into which pins can be inserted during a pin assignment. Reference is made to the description above in connection with the pins and the pin assignment. Along with the connection of the transmission lines to the control unit, the second connector can also connect further lines to the control unit.

According to the present invention, the first connector is designed differently from the second connector. In particular, the first connector differs from the second connector in respect of its function in the control system. The first connector can be functionally designed in such a way that it causes a connected control unit to terminate the transmission lines, i.e. to incorporate a terminating resistance. Conversely, the second connector can be functionally designed in such a way that a connected control unit instead performs no termination.

The first connector can accordingly differ functionally from the second connector in that it implements an operative connection between the first termination path and at least one of the transmission lines of the bus system, whereas the second connector instead does not implement a similar operative connection between the second termination path and at least one of the transmission lines of the bus system. The first termination path is activated in this way, whereby the first terminating resistor of the control system is terminated, whereas the second termination path remains inactive, whereby the second terminating resistance remains inactivated without a termination function in the bus system. Consequently, the first terminating resistor serves to maintain a total impedance of the bus system. The first terminating resistor and therefore the first control unit can implement this function because the first connector has a corresponding modification which implements an operative connection between the first termination path and at least one of the transmission lines of the bus system. The configuration of the first connector therefore allows a control unit without a termination function to be transformed into a control unit with a termination function.

In one design of the system, preferably, the number of provided first connectors which perform a termination corresponds exactly to the actual number of open ends of the transmission lines. If, for example, the transmission lines have a strictly linear design, precisely two terminating (first) connectors are provided. In the case of a star-shaped arrangement, the number of terminating connectors matches the number of open ends—for example three, four or more terminating connectors. The remaining connectors are all designed as second connectors which do not implement a termination.

This offers a number of advantages. Different control units are thus arrangeable at any positions within the control system without already planning the termination during the arrangement. This is possible since a desired termination function is implementable depending on the respectively used connector and not depending on the respectively used control unit. This increases flexibility in the arrangement of the individual control units in relation to one another in the control system. Furthermore, since the connectors differ structurally from one another, the respectively intended function of the connector can be performed reliably and robustly. A structural difference between the first connector and the second connector further has the effect that the function implemented in each case by the connector is visible or identifiable from outside, e.g. during assembly, thus reducing the risk of incorrect assembly or commissioning, and consequently increases operational reliability. Furthermore, since the terminating resistance to be arranged in a bus system is arranged inside the respective control units of the control system, it is protected against external influences such as corrosion, ingress of dirt, for example due to electrically conducting dust, temperature, movement of the transmission lines and vibration.

In one embodiment, along with the different function carried out in the control system, the first connector can differ from the second connector at least in respect of a hardware-related difference, wherein a line bridge is arranged in the first connector. The line bridge in the connector is adapted to connect the first termination path to at least one transmission line and therefore to integrate the first terminating resistor into the bus system. The line bridge can be insertable into a side facing away from the control unit, i.e. facing toward the transmission lines. The line bridge can be inserted into the side in which the pin assignment is implemented. A line bridge chamber provided specifically for this purpose can be arranged in the connector for the line bridge. This line bridge chamber can be distinguishable from the remaining chambers due to its size.

Alternatively, the line bridge chamber can assume a shape identical to that of the remaining chambers in the connector.

The line bridge can be designed in such a way that it establishes an operative electrical connection between the first termination path in one of the transmission lines. The line bridge can have a sheath made from insulating material. The line bridge can be identifiable from outside, so that the first connector is outwardly distinguishable from the second connector. The line bridge can have a simple geometry in order to implement the function of connecting the first termination path to the respective transmission line reliably and robustly, i.e. with little susceptibility to error. In the present aspect of the invention, the term of the first connector can therefore comprise the totality of the connector plus the line bridge.

In one embodiment, the first connector can also differ structurally from the second connector exclusively in respect of a line bridge in the first connector which is adapted to connect the first termination path to at least one transmission line and therefore to integrate the first terminating resistor into the bus system.

The line bridge can be designed in such a way that it establishes an electrical operative connection between the first termination path and one of the transmission lines. Reference is made to the features specified above with regard to possible designs of the line bridge. Since the connectors of the control system differ exclusively in respect of the line bridge, it can be guaranteed that the fundamental architecture of a connector in the control system is the same. This increases simplicity in the design of the control system and reduces complexity in production. In the present aspect of the invention, the concept of the first connector can therefore comprise the totality of the connector plus the line bridge.

In one embodiment, the line bridge can be designed and configured to be detachably insertable into the first connector. A transformation from a connector (such as the second connector) implementing no termination into a connector (such as the first connector) implementing a termination can be achieved in this way via a simple insertion of the line bridge. This reduces susceptibility to error in operation and increases the flexibility and operability of the control system. The detachability can also entail a reversibility, so that the first connector is transformable into the second connector by removing the line bridge. The second connector can similarly be transformable into the first connector by inserting the or a line bridge, respectively. This increases the modularity and interchangeability of the components of the control system. The line bridge can have a uniform shape or a shape individually adapted to the respective connector depending on the dimensions of the individual connectors.

In one embodiment, the line bridge can be adapted in the inserted state to establish a permanent, non-switchable connection between the first termination path and a transmission line. This reduces the complexity with which the connector and the line bridge are to be designed. The susceptibility to error of the control system is similarly minimized by the permanent, non-switchable connection. Since a control unit does not change its position in operation once it is integrated into a bus system, the non-switchability does not impair the functionality and conversely increases robustness.

In a further embodiment, precisely one termination path with precisely one terminating resistor can be provided in the first control unit. Alternatively or additionally, precisely one termination path with precisely one terminating resistor can also be provided in the second control unit. It is therefore possible to achieve the intended flexibility in the arrangement of the individual control units using the smallest possible number of additional components. The one terminating resistor can have a resistance of 120 ohms. Since precisely one termination path and precisely one terminating resistor are implemented per control unit, the required installation space for the respective control units also remains minimal.

The invention similarly comprises a connector for connecting a control unit to transmission lines of a bus system. With regard to possible designs of the control unit and the bus system, reference is made, to avoid duplication, to the corresponding parts of the disclosure which describe these components, for example, in connection with the control system.

The connector has an control unit side interface which is adapted to accommodate a first data transmission path, a second data transmission path and a termination path. A path is generally understood to mean an electrical line of a control unit which is connected, for example, to the printed circuit board of the control unit and thus routes a connection outward. The control unit side interface can therefore enable an attachment or insertion of the connector onto a control unit so that the control unit is integrated into the bus system. The first data transmission path can be prepared for connection to the first transmission line of the bus system, whereas the second data transmission path can be prepared for connection to the second transmission line of the bus system. A data transmission by the bus system can be ensured in this way. The control unit side interface can have additional connections depending on which connections the respective control unit has for specific functions.

The termination path can be operatively coupled to a terminating resistor inside the control unit.

The connector also has an bus side interface which is adapted to connect the first path to a first transmission line and the second path to a second transmission line. A signal transmission between the control unit connected by the connector and the other system components of the bus system can be enabled in this way. To avoid duplication, reference is made to the description above with regard to the function of the bus side interface.

The bus side interface further has a chamber into which a line bridge is insertable in order to connect the termination path out from the control unit to at least one transmission line of the bus system. The terminating resistor of the control unit operatively coupled to the termination path can therefore be activated, i.e. integrated into the bus system, via the insertion of the line bridge. The connector can be provided to be used or applied in a control system according to this disclosure. Through the provision of the chamber, the connector enables a flexible use of both the connector itself and the control system connected to it. The connector is consequently adaptable to different requirements of the bus system.

In one embodiment, the line bridge can be inserted into the chamber. In this way, it forms part of the connector. The insertion can be performed reversibly, so that an inserted line bridge is again removable from the connector. Alternatively, the insertion can also be irreversible, so that a non-destructive detachment of the line bridge from the connector is not possible. In the present aspect of the invention, the concept of the connector can therefore comprise the totality of the connector plus the line bridge.

The invention also aims to provide a method for configuring a bus system having at least two transmission lines. With regard to possible designs of the bus system, reference is made, to avoid duplication, to the corresponding parts of the disclosure which describe these components, for example in connection with the control system.

The method has the step of connecting a first control unit having a first termination path and a first terminating resistor connected thereto to a first connector which connects the first control unit to at least one transmission line. The connection can establish an operative connection between the first control unit and the first connector, so that they communicate with one another in the bus system. The connection can be established as form-locking, e.g. by insertion, and/or as force-looking, e.g. by screwing. With regard to possible designs of the control unit, the termination path, the terminating resistor and the connector, reference is made, to avoid duplication, to the corresponding parts of the disclosure which describe these components, for example in connection with the control system or the connector.

The method further has the step of connecting a second control unit having a second termination path and a second terminating resistor connected thereto to a second connector which connects the second control unit to at least one transmission line. The connection can establish an operative connection between the second control unit and the second connector, so that they communicate with one another in the bus system. Reference is made to the description above with regard to possible designs of the connection.

The method further has the step of inserting a line bridge into either the first connector, so that an operative connection is established between the first termination path and at least one transmission line and therefore the first terminating resistor is integrated into bus system. With regard to possible designs of the line bridge, reference is made, to avoid duplication, to the corresponding parts of the disclosure which describe this component, for example in connection with the control system or the connector. As soon as the line bridge is inserted into the connector, it can be regarded as being associated with the connector.

Or the method further has the step of inserting the line bridge into the second connector, so that an operative connection is established between the second termination path and at least one transmission line and therefore the first terminating resistor is integrated into the bus system. As soon as the line bridge is inserted into the connector, it is regarded as being associated with the connector. Since the step of inserting the line bridge can be carried out with either the first or the second connector, the method is individually adaptable to corresponding framework conditions in a bus system. The advantages disclosed in connection with the control system and the connector are—insofar as technically appropriate—also applicable to the present method and will not be described again individually here.

In one embodiment of the method, the insertion of the line bridge into the first or the second connector can be reversible. This is to be understood to mean that the line bridge is again non-destructively detachable following insertion. Either the first or the second connector can therefore establish a connection between the corresponding terminating resistor and therefore activate it.

Alternatively, the insertion can also be performed irreversibly, so that a line bridge, once it is connected to the connector, is no longer detachable from it, as a result of which a connector, once it has activated a terminating resistor, can then only be used as such a connector which activates the terminating resistor. In one alternative or additional embodiment, the line bridge in the inserted state can establish a permanent, non-switchable connection between the respective termination path and at least one transmission line. This reduces the complexity of the method, since it no longer changes its operating state following the initial assumption of this state. The susceptibility to error of the method is similarly minimized by the permanent, non-switchable connection.

Features and advantages which are set out in this disclosure for the control system or the connector or the method can—insofar as this is technically appropriate—be interchanged with one another in accordance with this disclosure.

BRIEF DESCRIPTION OF THE FIGURES

Preferred further embodiments of the invention will be explained in detail by means of the following description of the figures. In the figures.

DETAILED DESCRIPTION OF PREFERRED EXAMPLE EMBODIMENTS

Preferred example embodiments are described below with reference to the figures. Identical, similar or similarly acting elements are denoted with identical reference signs in the different figures and a description of these elements is in some instances not repeated in order to avoid duplication.

The design of a control system for a bus system having two transmission lines to be terminated, i.e. having two transmission lines to be provided with a terminating resistor, is presented schematically below on the basis of a CAN bus system. The CAN bus system is also representative here of other bus systems in which at least two transmission lines have to be terminated and in which a plurality of control units communicate with one another via the common transmission line.

Figure 1:
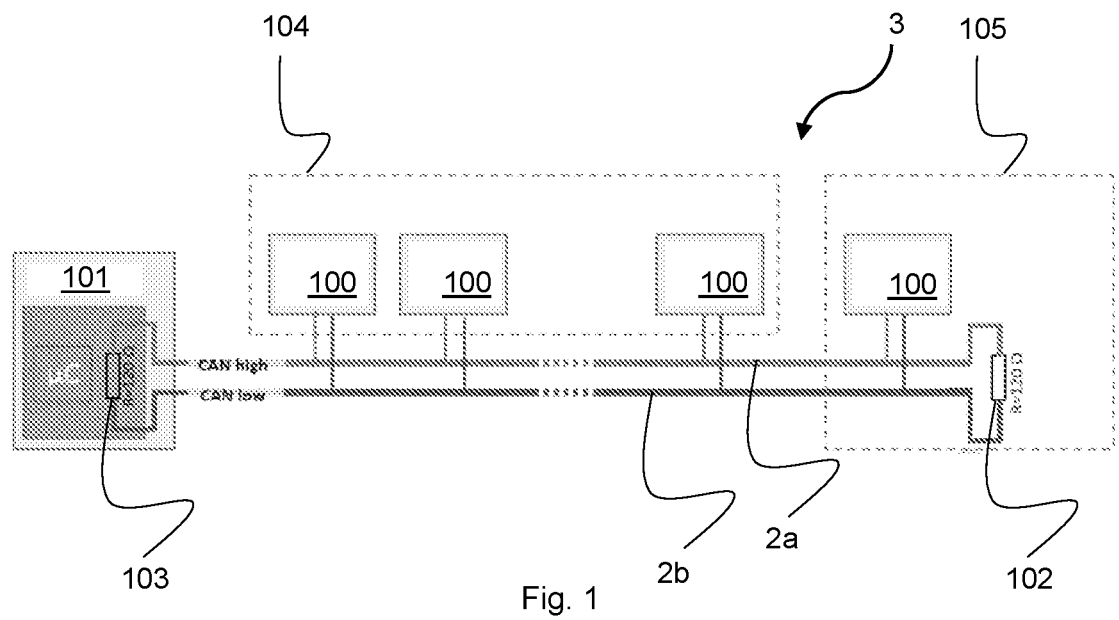
FIG. 1 shows a schematic view of a CAN bus system in general form.

FIG. 1 correspondingly represents the basic design of a CAN bus system 3. A control system 1 for use in a CAN bus system 3 having at least two transmission lines 2a, 2b will be explained in detail with reference to FIGS. 2 to 4. The CAN bus system 3 will first be described in its general form with reference to FIG. 1.

The CAN bus system 3 has a first transmission line 2a and a second transmission line 2b. The first transmission line 2a can be referred to as a CAN high line. The second transmission line 2b can be referred to as a CAN low line.

In an idle state, also referred to as a recessive state, the same voltage is present on both transmission lines 2a, 2b. This voltage can be, for example, 2.5 V. As soon as a signal is to be transmitted via the transmission lines 2a, 2b, i.e. the latter switch to a dominant state, the voltage on the CAN high line 2a increases, for example by 1 V. The voltage similarly decreases in the dominant state on the CAN low line 2b, for example similarly by 1 V. The voltage difference between the CAN high line 2a and the CAN low line 2b is therefore 0 V in the recessive state and, by way of example, 2 V in the dominant state, whereby a data transmission is enabled.

In order to inhibit reflections occurring in the CAN bus system 3 which can cause interference and therefore signal faults, two terminating resistors 102, 103, are generally to be arranged on opposite ends of the CAN bus system 3 to terminate the CAN bus system 3 and therefore instigate a targeted power dissipation on the respective terminating resistor 102, 103. The two terminating resistors in each case produce a resistance of 120 ohms for a total impedance of, for example, 60 ohms in the CAN bus system.

The CAN bus system 3 from FIG. 1 has a main control unit 101 which contains the terminating resistor 103. It similarly has any number of further control units 100 which are all connected to the transmission lines 2a, 2b. These control units 100 can be responsible, for example, for a battery control, a vehicle circuit, an airbag or other electronically controllable components. These control units 100 can be divided into a group of non-terminated control units 104 on the one hand, and into a terminating control unit 105 on the other hand. Whereas the non-terminated control units 104 implement no termination, i.e. they integrate no terminating resistor into the system, the terminated control unit 105 can implement a termination. The terminating resistor 102 is arranged in the terminated control unit 105 for this purpose.

Figure 2:
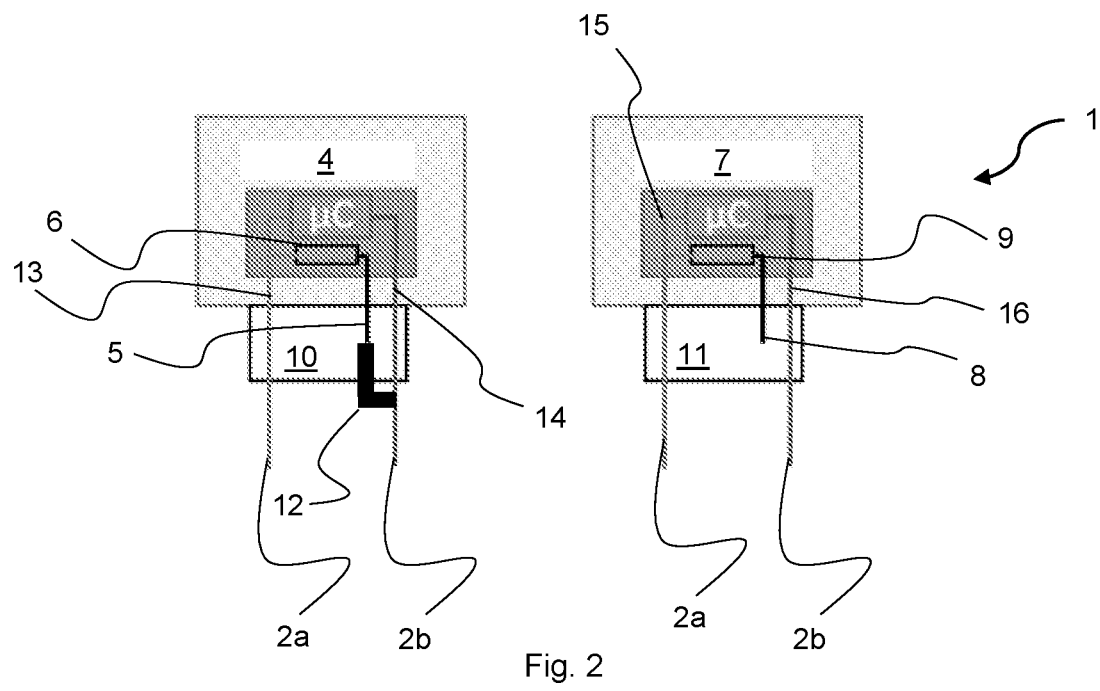
FIG. 2 shows a schematic view of a control system having a first control unit and a second control unit according to one embodiment.

FIG. 2 shows schematically a control system 1. This has a first control unit 4. A first termination path 5 is arranged in the first control unit 4. This can be accessible from outside the first control unit 4. A first terminating resistor 6 is further arranged in the first control unit 4. The first terminating resistor 6 is connected on one side to the first termination path 5 and on the other side to a first data transmission connection 13 of the control unit 4. The arrangement from FIG. 2 is shown merely by way of example. The terminating resistor 6 can similarly be arranged between the termination path 5 and a second data transmission connection 14 of the control unit 4.

The first data transmission connection 13 and the second data transmission connection 14 in each case represent electrical lines which are prepared for connection via a first connector 10 to the transmission lines 2a, 2b of the CAN bus system 3. The data transmission connections 13, 14 are typically combined on their open end in a socket which is designed as complementary to the connector 10 so that these internal data transmission connections 13, 14 of the control unit can be connected to the transmission lines 2a, 2b of the CAN bus system 3.

The first connector 10 therefore couples the first control unit 4 to the transmission lines 2a, 2b of the CAN bus system 3. A line bridge 12 is inserted into the first connector 10. A chamber provided correspondingly for the line bridge 12 can be arranged in the first connector 10 for this purpose. The line bridge 12 can be provided here in the form of a line splice which is arranged on its one end in the chamber in the connector 10 and its other end is either also spliced directly to the transmission line 2b inside the chamber of the connector 10 or this connection is established outside the connector. The line bridge 12 establishes an electrical connection between the second data transmission connection 14 and the first termination path 5. In this way, a voltage present in the second data transmission connection 14 drops via the first terminating resistor 6, as a result of which the first terminating resistor 6 is integrated into the CAN bus system 3. The first terminating resistor 6 therefore maintains the total impedance of, for example, 60 ohms in the CAN bus system 3.

Along with the first control unit 4, the control system 4 can have a second control unit 7. The design of the second control unit 7 is essentially similar to that of the first control unit 4. In one embodiment, the first control unit 4 and the second control unit 7 can also be identical. A second terminating resistor 9 is therefore arranged inside the second control unit 7. A second termination path 8 which is provided for connection to a second connector 11 is similarly arranged in the second control system 7. A third data transmission connection 15 and a fourth data transmission connection 16 provide an electrical connection of the second control unit 7 into the CAN bus system 3.

Here, similar to the first control unit 4, the second terminating resistor 9 is arranged between a second termination path 8 and the third termination path 15. No line bridge 12 is arranged in the connector 11 coupled to the second control unit 7, as a result of which the fourth data transmission connection 16 has no electrical connection to the second termination path 8. The second terminating resistor 9 is consequently not activated. The first connector 10 differs from the second connector 11 in respect of the arrangement of the line bridge 12. A termination of the CAN bus system 3 is consequently achieved by the different connector arrangement on a preferably identical control unit 4, 7.

The control units 4, 7 from FIG. 2 which are preferably identical to one another at least in respect of the design of the termination resistors in each case have two data transmission connections 13, 14, 15, 16. Each data transmission connection is connected to an electrical component which is represented here abstractly as a capacitor. The control units 4, 7 in each case further have a termination path 5, 8. In this embodiment, the first connector 10 therefore accommodates three paths 5, 13, 14 in total on a side facing toward the first control unit 4. The second connector 11 in this embodiment similarly accommodates three paths 8, 15, 16 on a side facing toward the second control unit 7. High flexibility is therefore achievable via a small number of paths.

Figure 3:
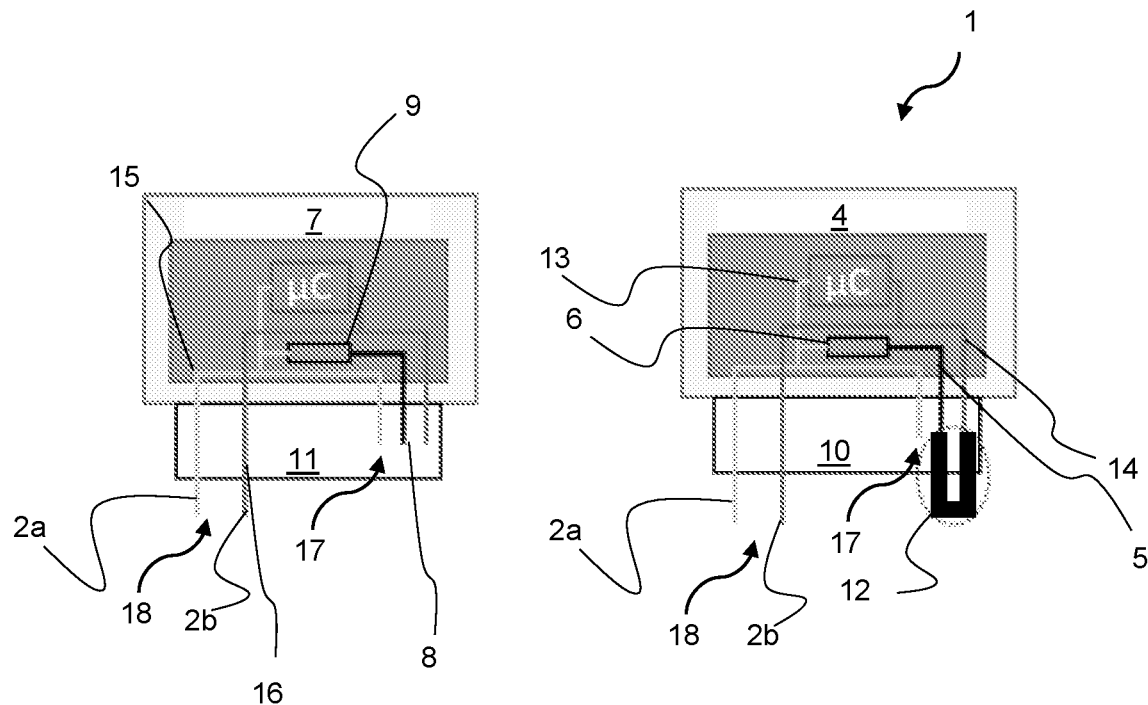
FIG. 3 shows a schematic view of a control system having a first control unit and a second control unit according to a further embodiment.

FIG. 3 shows a second embodiment of the control system 1, having the first control unit 4 and the second control unit 7. As in the embodiment previously described in connection with FIG. 2, these control units are designed, for example, as structurally identical to one another. The first connector 10 is arranged on the first control unit 4, the second connector 11 on the second control unit 7. The first control unit 4 has the first termination path 5, the first terminating resistor 6, the first data transmission connection 13 and the second data transmission connection 14. Similarly, the second control unit 7 has the second termination path 8, the second terminating resistor 9, the third data transmission connection 15 and the fourth data transmission connection 16.

The first connector 10 has a line bridge 12 which, in the present example, connects the second data transmission connection 14 to the first termination path 5 so that the first terminating resistor 6 arranged in the first control unit 4 is integrated as a terminating resistor into the CAN bus system via the line bridge 12. The basic mode of operation of the control system 1 from FIG. 3 is similar to that shown in FIG. 2. The arrangement of the first terminating resistor 6 between the first termination path 8 and the first data transmission connection 13 is shown by way of example. It could similarly be arranged between the first termination path 8 and the second data transmission connection 14. This consideration is applicable to the arrangement of the second terminating resistor 9 in the second control system 7.

The individual data transmission connections of the control units from the embodiment according to FIG. 3 are similar in respect of their basic function to those of the embodiment according to FIG. 2. In respect of their structural design, the individual data transmission connections are provided in each case with two connections. Both control units 4, 7 in each case therefore have a termination connection 17 and a data transmission connection 18 for coupling to the connector 10, 11. The termination connection 17 is composed of paths which are prepared in order to be accommodated by the connector 10, 11 in order to provide a termination in this way—depending on the connector that is used. The data transmission connection 18 is composed of paths which are prepared in order to set up a connection to the transmission lines 2a, 2b via the connector 10, 11. The actual coupling between the transmission lines 2a, 2b and the respective control unit 4, 7 is therefore established via the transmission line connection 18.

An electrical connection is established between the first termination line 5 and the second data transmission connection 14 via the insertion of the line bridge 12 into the first connector 10, as a result of which the first terminating resistor 6 is integrated as a termination into the CAN bus system. In this way, the chamber on the first connector 10 which is prepared in order to accommodate the line bridge 12 is structurally separated from the interface between the transmission lines 2a, 2b and the first control unit 4 or the first connector 10, thus increasing operational reliability. A separation of the individual functions i.e. the functions of transmission to the CAN bus system and integration of the terminating resistor is similarly achieved in this way. This increases certainty and reduces susceptibility to error during assembly.

Figure 4:
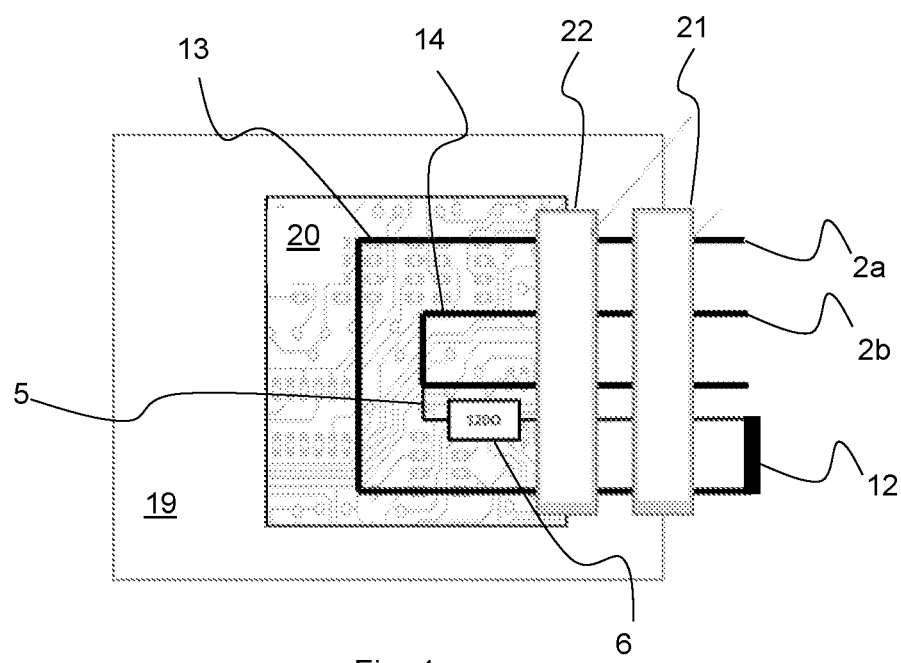
FIG. 4 shows a schematic view of a further control unit.

FIG. 4 shows the concept according to the invention in a further environment. Reference sign 19 denotes a control unit here by way of example in the form of a vehicle interface controller. The transmission lines 2a, 2b are coupled to the vehicle interface controller 19 via an external connector 21. An internal connector 22 is then arranged in order to establish a connection to an internal printed circuit board 20. The external connector 21 and the internal connector 22 can be similar in respect of their structural design to the first connector 10 and the second connector 11.

The pin assignment, i.e. the configuration of the individual pins, can differ here for the internal connector 22 and the external connector 21. Electrical lines of the printed circuit board 20 or the vehicle interface box 19 are connected to the CAN bus system 3 during the pin assignment through targeted insertion of the pins. The termination path 5 which is in turn operatively coupled to the first terminating resistor 6 is arranged on the printed circuit board 20. The line bridge 12 is inserted into the first connector 10 outside the vehicle interface controller 19 in order to integrate the first terminating resistor 6 into the CAN bus system 3. The present embodiment shows the variable usability of the connectors according to this disclosure which implement a flexibly adaptable termination of the CAN bus system 3 by means of the line bridge 12.

Insofar as applicable, all individual features which are shown in the example embodiments can be combined and/or exchanged with one another without departing the scope of the invention.

REFERENCE NUMBER LIST

1 Control system
2a,b Transmission line
3 CAN bus system
4 First control unit
5 First termination path
6 First terminating resistor
7 Second control unit
8 Second termination path
9 Second terminating resistor
10 First connector
11 Second connector
12 Line bridge
13 First data transmission connection
14 Second data transmission connection
15 Third data transmission connection
16 Fourth data transmission connection
17 Termination connection
18 Data transmission connection
19 Vehicle interface controller
20 Printed circuit board
21 External connector
22 Internal connector

The invention claimed is:

1. A control system for a bus system having at least two transmission lines, wherein the control system comprises:
a first control unit which has a first termination path and a first terminating resistor connected to the first termination path;
a second control unit which has a second termination path and a second terminating resistor connected to the second termination path;
a first connector which is configured to connect the first control unit to the transmission lines and thus integrate the first control unit into the bus system;
a second connector which is configured to connect the second control unit to the transmission lines and thus integrate the second control unit into the bus system;
wherein the first connector and the second connector are designed differently from one another;
wherein the first connector differs structurally from the second connector exclusively in respect of a line bridge in the first connector which is configured to connect the first termination path to at least one transmission line and thus integrate the first terminating resistor of the first control unit into the bus system; and
wherein the line bridge is configured to be detachably insertable into the first connector.

2. The control system as claimed in claim 1, wherein the first connector differs from the second connector at least in respect of a line bridge in the first connector which is configured to connect the first termination path to at least one transmission line and thus integrate the first terminating resistor of the first control unit into the bus system.

3. The control system as claimed in claim 1, wherein the line bridge in the inserted state is configured to establish a permanent, non-switchable connection between the first termination path and a transmission line.

4. The control system as claimed in claim 3, wherein precisely one termination path having precisely one terminating resistor is provided in the first control unit.

5. The control system as claimed in claim 3, wherein at least two termination paths are provided in the first control unit and are provided in each case with a terminating resistor, and the termination path which is integrated into the bus system is selectable by the connector.

6. The control system as claimed in claim 5, wherein at least two first connectors are configured so that they in each case integrate a terminating resistor via the respective termination path of the respectively contacted control unit into the bus system, and at least a second connector is designed and configured so that the terminating resistor provided in the respectively contacted control unit is not integrated into the bus system.

7. The control system as claimed in claim 1,
wherein the first connector comprises:
a control unit side interface which is adapted to accommodate a first data transmission path, a second data transmission path, and a termination path; and
a bus side interface which is adapted to connect the first path to a first transmission line and the second path to a second transmission line;
wherein the bus side interface has a chamber into which a line bridge is insertable in order to connect the termination path to at least one transmission line.

8. The control system as claimed in claim 7, wherein the line bridge is inserted into the chamber.

9. A method for configuring a bus system having at least two transmission lines comprising:
connecting a first control unit having a first termination path and a first terminating resistor connected thereto to a first connector which connects the first control unit to at least one transmission line;
connecting a second control unit having a second termination path and a second terminating resistor connected thereto to a second connector which connects the second control unit to at least one transmission line;
inserting a line bridge into at least one of: the first connector so that an operative connection is established between the first termination path and at least one transmission line and the first terminating resistor is therefore integrated into the bus system, wherein the line bridge in the inserted state establishes a permanent, non-switchable connection between the respective termination path and at least one transmission line, and
the second connector so that an operative connection is established between the second termination path and at least one transmission line and the second terminating resistor is therefore integrated into the bus system.

10. The method as claimed in claim 9, wherein the insertion of the line bridge into the first or the second connector is reversible.

11. The control system as claimed in claim 3, wherein precisely one termination path having precisely one terminating resistor is provided in the second control unit.

* * * * *